*Reissue.*
*Calvin Z. Kroh's Curtain Knob.*
4019
REISSUED JUN. 7, 1870.
*Fig. 1*
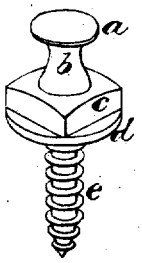
*Fig. 4*
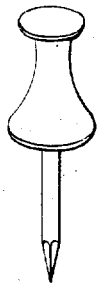
*Fig. 2*
*Fig. 3*
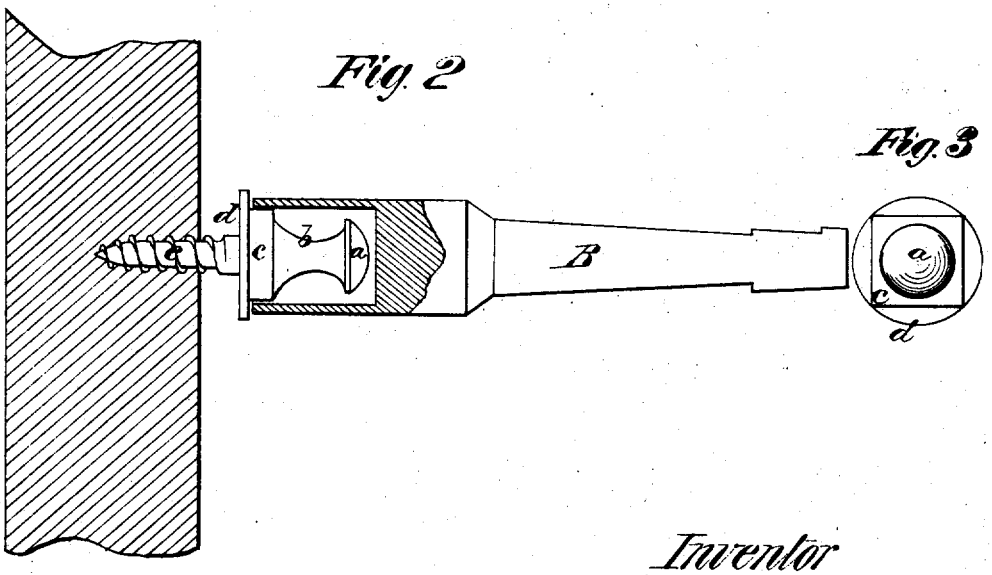
*Witnesses*
R. J. Campbell
J. N. Campbell
*Inventor*
Calvin Z. Kroh
by
Munn & Scheidhammer.

United States Patent Office.

CALVIN Z. KROH, OF TIFFIN, OHIO.

*Letters Patent No.* 49,634, *dated August* 29, 1865; *reissue No.* 4,019, *dated June* 7, 1870.

IMPROVEMENT IN CURTAIN-KNOBS.

The Schedule referred to in these Letters Patent and making part of the same

*To all whom it may concern:*

Be it known that I, CALVIN Z. KROH, of Tiffin, in the county of Seneca and State of Ohio, have invented a new and improved Knob-Fastening for Curtains, and other analogous purposes; and I do hereby declare that the following is a full, clear, and exact description thereof, reference being had to the accompanying drawing making part of this specification, in which—

Figure 1 is a perspective view of my improved curtain-knob.

Figure 2 shows a mode of inserting the same in wood.

Figure 3 is an enlarged top view of the knob.

Figure 4 shows one of the old forms of knobs.

Similar letters of reference indicate corresponding parts in the several figures.

The object of this invention is to improve knobs or button fastenings for carriage-curtains and other analogous purposes, by constructing the same with a polygonal or prismatic or angular enlargement between a contracted neck and a screw-threaded portion, thereby admitting the use of a smooth or rounded head, which will not readily wear out the curtains about their button-holes, and, at the same time, affording a means for the convenient use of a hollow screw-driver to insert the screw portion of the knobs, as will be hereinafter explained.

To enable others skilled in the art to understand my invention, I will explain its construction and operation.

In the accompanying drawing—

*a* represents the button-head of the knob, which is formed on one end of a contracted neck, *b*, which neck terminates at the other end in a nut or polygonal enlargement, *c*, between which and a screw portion, *e*, a circular flange, *d*, may or may not be formed.

The form of the portions *a* and *b* of the knob need not differ in any respect from those which are commonly used, that is to say, the portion *a* is made smooth and rounded, so as to present a neat appearance. Its surface is not interrupted by angles nor elevations of any kind, which would soon abrade and wear out the curtain about its button-hole, nor is that portion of the neck, at its junction with the head *a*, thus interrupted.

Between the neck of this knob and a screw stem, *e*, is the enlargement *c*, which has its sides flattened and adapted for receiving a bit-wrench or screw-driver, B, as shown in fig. 2, by which said stem can be readily screwed into wood, and the knob thus secured in place.

The screw-thread on stem *e* may be formed upon a smooth stem, which is formed on the nut-shaped or angular enlargement of the knob, but I prefer to cast the knobs or button-heads around the heads of tapering-pointed wood-screws.

In fig. 4, one of the old forms of curtain-knob is shown, from which it will be seen that there is no provision made for preventing this fastenting from being drawn out of place, except in some instances where the points of the stems can be clinched, which is always objectionable, as it is liable to split the part through which the stems are driven.

I am aware also that polygonal knobs have hitherto been made with screw-threaded stems on them, the polygonal portions being intended for receiving eyelet plates fastened on the curtain. Such a contrivance is found in the Letters Patent granted to George Cook, January 6, 1859.

The objection to the polygonal head in Cook's device, if used for the same purpose as I employ the nut *c*, is that such head is unsightly, and would rapidly abrade and wear out that portion of the curtain (the button-hole) which is applied over it.

By my invention I am enabled to insert the screw-stems of the knobs without using a hammer, which, with some of the old forms of fastenings, batters and very often breaks off the heads.

I so locate the enlargement which is adapted to receive the wrench, that a smooth button-head and a smooth neck are afforded, which will allow a curtain to be readily fastened to the same, without liability to injure or tear out the button-hole; and I also so locate the enlargement *c* that the knob will be received into the socket of the wrench used to insert the screw, and thus allow the knob to be firmly held and guided while its screw-stem is being inserted.

The nut *c* may be octagonal, hexagonal, or polygonal, but the simplest form is that represented in the drawing. I prefer to use the flange *d*, but do not confine myself thereto.

Having thus described my invention,

What I claim as new, and desire to secure by Letters Patent, is—

The angular enlargement or nut *c*, located between the neck *b* and a screw-stem, *e*, substantially as set forth.

CALVIN Z. KROH.

Witnesses:
E. R. HAYS,
H. C. NOBLE.